Nov. 27, 1934.    G. M. BELLANCA    1,982,242
WING STRUCTURE
Filed Jan. 11, 1932    2 Sheets-Sheet 1
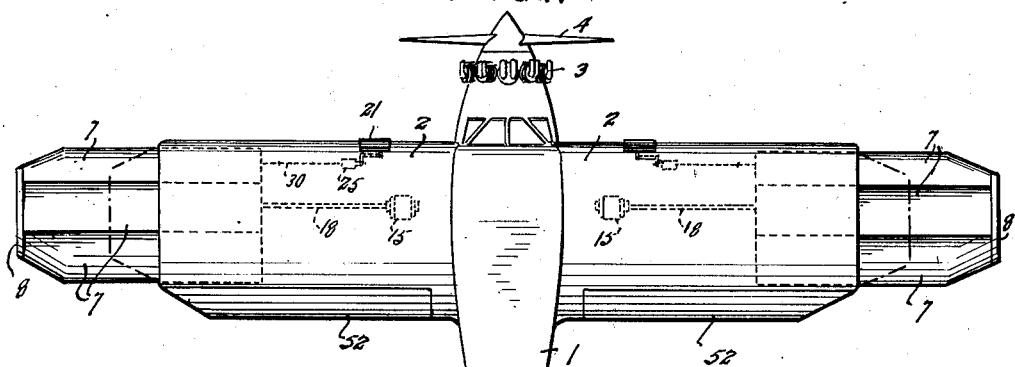
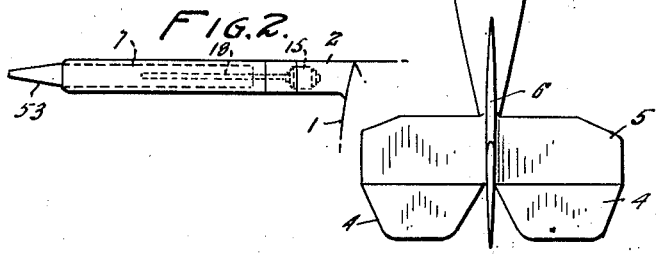
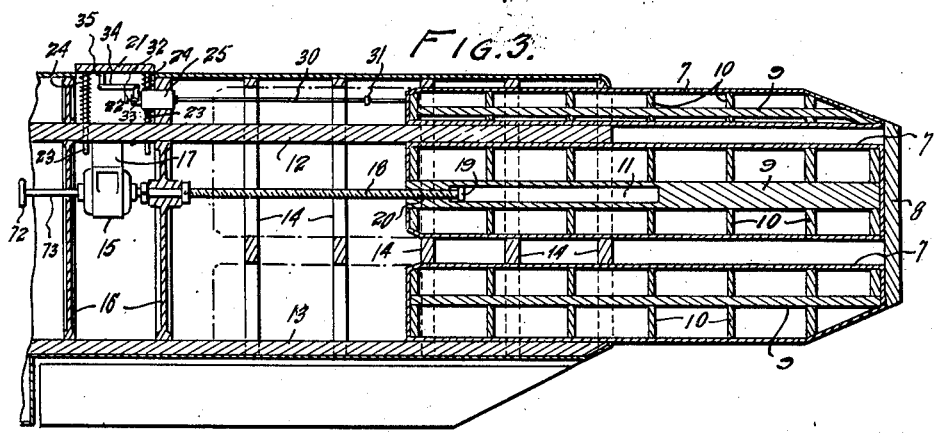
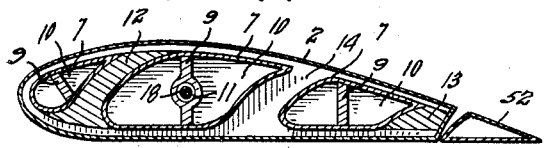
Inventor
GIUSEPPE M. BELLANCA
By Semmes & Semmes
Attorneys Nov. 27, 1934.  G. M. BELLANCA  1,982,242
WING STRUCTURE
Filed Jan. 11, 1932   2 Sheets-Sheet 2

Inventor
GIUSEPPE M. BELLANCA

By Semmes & Semmes
Attorneys

Patented Nov. 27, 1934

1,982,242

UNITED STATES PATENT OFFICE 1,982,242

WING STRUCTURE

Giuseppe M. Bellanca, New Castle, Del.

Application January 11, 1932, Serial No. 586,010

4 Claims. (Cl. 244—12)

This invention relates in general to airplanes and more particularly has reference to auxiliary wings therefor.

It is well known that additional lifting surface at the take-off and landing of an airplane is very desirable. This is especially true when an airplane takes off or lands at a low speed. When an airplane, however, is in the air and traveling at its cruising speed, additional lifting surfaces are not generally required. It has been customary in the past to provide exceptionally long and wide main wings in order to obtain the correct amount of lift. This, while necessary in certain instances, never-the-less offers a much greater surface to the wind thereby materially decreasing the cruising speed of the plane. Speed is essential in airplane transportation, but it is necessary that sufficient lifting surfaces be provided for the take-off and landing of the plane. However, after the additional lifting surfaces required have served their useful purpose, it would be advantageous to remove them from the influence of wind pressure, one of the main factors reducing the speed of aircraft.

An object of this invention is to provide auxiliary wings for an airplane.

Another object of this invention is to provide a plurality of auxiliary wings on each side of the fuselage of an airplane.

A further object of this invention is to provide novel means for actuating the auxiliary wings.

A still further object of this invention is to provide a plurality of auxiliary wings adapted to be retracted within the main wing.

Still another object of this invention is to provide means for operating the auxiliary wings on one side of the airplane independently of the other.

Yet another object of this invention is to provide a plurality of auxiliary wings adapted to be retracted within a main wing and free of interference from the internal structure of the main wing.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

The invention broadly comprehends the provision of auxiliary wings adapted to be retracted within and extended from the main wing of an airplane. One method of practicing the concept of the invention is to provide means on the leading edge of the wing which actuate other suitable means connected to the auxiliary wings when the airplane is in flight.

In order to make my invention more clearly understood, I have shown, in the accompanying drawings, means for carrying the same into practical effect without limiting the improvements in their useful applications to the particular constructions which, for the purpose of explanation, have been made the subject of illustration.

Figure 1 is a top view of an airplane showing the auxiliary wings extended.

Figure 2 is a top view of a main wing on one side of the fuselage showing a single auxiliary wing.

Figure 3 is a top sectional view of the main wing and auxiliary wings.

Figure 4 is a side elevational view of the auxiliary wings within the main wing.

Figure 5:
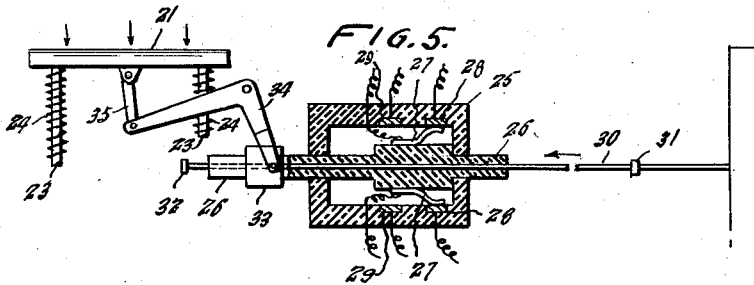
Figure 5 is a view showing a reversing switch for the auxiliary wings and its actuating means.

Referring to the drawings wherein similar parts are designated by like numerals throughout, and more particularly to Figure 1, there is shown an airplane comprising a fuselage 1 and a main wing 2 suitably attached to each side thereof. A source of motive power 3 is positioned in the front of the fuselage 2 and attached thereto is a propeller 4. While I have shown the source of motive power 3 as a radial motor, it is to be clearly understood that any other type may be employed.

The fuselage 1 carries at the tail thereof the usual empennage which consists of fins 4, secured to stabilizers 5 and a rudder 6.

The main wings 2 may be of wood or metal construction and adapted to be retracted within or extended therefrom are a plurality of wings 7. The plurality of wings 7 may be of the same material as the main wings 2 and are joined together at their outer ends by means of a narrow brace 8.

Referring now to Figure 3 where the details of the auxiliary wings and main wings are shown, each auxiliary wing 7 is provided with a spar 9 and associated ribs 10. The middle auxiliary wing 7 is larger than the others and as a consequence the spar is of larger size. A slot 11 is provided in the middle auxiliary wing spar, the purpose of which will hereinafter appear.

Each main wing 2 has a front spar 12 and a rear spar 13. Associated with the spars 12 and 13 are ribs 14 for shaping the wing. The front spar 12 is designed to pass in the space between the first two auxiliary wings 7 as shown in Figure 4, to act as a guide for the auxiliary wings and the rear spar 13 tends to maintain the auxiliary wings in a centered position.

A reversible motor 15 is suitably mounted within each main wing 2. The motor 15 may be of any conventional reversible type. As shown, the motor 15 is positioned between and secured to two adjacent ribs by means of plates 16 extending from the ribs. An additional support 17 suitably attached to the front spar 12 is also connected to the motor 15 by any suitable means. It will be readily seen that there has been provided a strong mounting for the motor 15 to prevent it from becoming disengaged. Associated with the rotor of the motor 15 is a screw shaft 18 provided with a head 19 for movement within the slot 11. The screw shaft 18 passes through the end of the spar 9 in the middle auxiliary wing and engages internal threads 20 provided therein. It will be readily seen from the above, that actuation of the rotor of the motor 15 causes the shaft 18 to rotate, thereby imparting longitudinal motion to the auxiliary wings 7.

It is desirable to force the auxiliary wings outward from the wings at low speeds and retract them when cruising or full speed has been obtained. In order to automatically actuate the auxiliary wings by the effect of air pressure, there is provided a curved plate 21 positioned within a slot 22, on each side of the fuselage. The plate 21 is slidably mounted to the front spar 12 by means of a pair of rods 23. A coil spring 24 surrounds each rod 23 and is positioned between the plate 21 and the front spar 12. As will be readily appreciated, when no wind pressure is exerted on the plate 21, the tension of the springs 24 will force it outwardly in the slot 22.

Associated with the plate 21 is a switch casing indicated generally by the numeral 25. Adapted to slide within the casing 25 is a member 26 carrying contactors 27 suitably secured thereto. The contactors 27 are adapted to complete an electric circuit through contact plates 28 and 29 embedded within the casing 25. Each of the contacts and contact plates has an electric wire connected thereto which form part of an electric circuit to be hereinafter explained. Slidably mounted within the member 26 is a rod 30 attached to one of the auxiliary wings 7 and having lugs 31 and 32 carried thereby to determine the length of travel of the rod within the member 26. Attached to the end of the member 26 by means of a friction connection is a connector 33. The connector 33 permits movement of the rod 30 therethrough as in the case of the member 26. A bell crank lever 34 is pivotally attached to the connector 33 and to the plate 21 by means of an arm 35.

The operation will be readily understood with reference to Figure 5. The plane has reached cruising or a higher speed and the air pressure produced thereby has depressed the plate 21 so as to move the member 26 to the position shown. An electric circuit is established between the contacts 27 and 28 which actuates the motor. The screw shaft 18 revolves in a clockwise direction drawing the auxiliary wings within the main wing. When the lug 31 engages the end of the member 26, it causes said member to move within the casing 25 to break the electrical circuit. When it is desired to land, the speed is decreased which allows the plate 21 to move outwardly under the action of the springs 24 thereby further moving the member 26 in the same direction within the casing 25. When the contacts 27 and 29 are in electrical engagement, the motor 15 is again actuated, but in an opposite direction, forcing the wings outwardly to provide more lifting surface upon landing. With the auxiliary wings in an extended position in taking off, the air pressure produced by the increased speed depresses the plate 21 which causes movement of the member 26, breaking the circuit established between contacts 27 and 29 and establishing a circuit between contacts 27 and 28, causing the motor to reverse its direction of rotation and retract the auxiliary wings.

Figure 6:
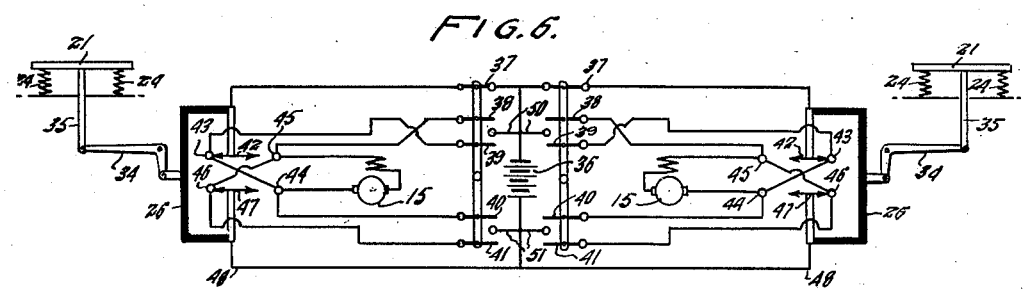
Figure 6 is a schematic view of the electrical circuit associated with the motor and actuating means.

In Figure 6 there is shown an electric circuit adapted to carry out the invention either automatically or manually. There is provided a battery 36 for the source of current. The battery may be the regular battery carried by the airplane or a separate one. The circuits for actuating the auxiliary wings being the same for each set, only one circuit will be described.

In the arrangement shown there is provided a switch having a plurality of arms; namely, 37, 38, 39, 40, and 41. The purpose of this switch will now be apparent. The circuit arrangement indicates that a circuit has been established to extend the auxiliary wings outwardly from a retracted position to an extended position. Accordingly, current is supplied to the motor 15 by the following circuit:

36—37—42—43—44—45—46—47—48—41    (1)

When the airplane has reached cruising or greater speed and the plate 21 is depressed by air pressure, current is supplied to the motor in an opposite direction to retract the auxiliary wings within the main wing by the following circuit:

36—37—42—45—44—47—48—41    (2)

If it is desired to operate the switches manually to supply current to the motor for extending or retracting each set of auxiliary wings, either together or separately, arms 50 and 51 are provided. When it is desired to extend the auxiliary wings by manual operation of the switches, arm 37 is opened and current is supplied to the motor by the following circuit:

36—50—38—45—44—40—51    (3)

To retract the auxiliary wings by manual operation of the switches, current is supplied to the motor in the opposite direction by the following circuit:

36—50—39—43—44—45—46—41—51    (4)

It will readily be seen from the foregoing that the two sets of auxiliary wings may be operated automatically by actuation of the plates 21 by air pressure, or if desired, either set may be operated independently of the other by manual manipulation of the switches. This latter feature is advantageous in that one set of auxiliary wings may be operated in conjunction with one of the ailerons 52, thereby obtaining quick maneuverability of the plane.

In Figure 2 there is shown a single auxiliary wing 53 adapted to be retracted and extended from the main wing 2. The single auxiliary wing is actuated in the same manner above described for the plurality of auxiliary wings.

In Figure 3 there is also shown manual means for operating each set of the auxiliary wings 7. A wheel 72 may be suitably positioned within the cockpit of the airplane and connected to the screw shaft 18 by means of a connecting shaft 73. It will be apparent that if it is desired to actuate the auxiliary wings manually, this may be accomplished by actuation of the wheel 72. By this arrangement, there is provided manual means for operating each set of the auxiliary wings either separately or together.

Figure 7:
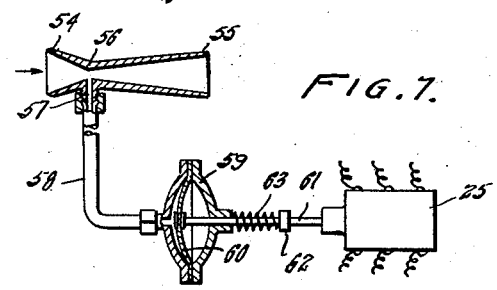
Figure 7 is a view showing a modification of the actuating means for the electric switch.

Figure 7 shows a modified form of actuating means for the electric switch shown in Figure 5. As illustrated, there is provided a Venturi tube suitably positioned on the main wings 2. This tube comprises flaring ends 54 and 55 and a constricted section 56 therebetween. Associated with the constricted section 56 is a vent 57 to which is connected a small tube 58. The tube 58 is connected to a chamber 59 which has positioned therein a diaphragm 60. Connected to the diaphragm 60 is a rod 61 having a lug 62 with a spring 63 positioned between the lug and the end of the casing 59. The rod 61 is connected to the switch 25 shown in Figure 5. In the position shown, the wings are in a retracted position and held in that position by the speed of the airplane. When the speed of the plane is decreased, such as at landing, the velocity of the fluid entering the flared end 54 is decreased, thereby increasing the pressure in the tube 58. This increase in pressure actuates the diaphragm 60 which causes it to move to the opposite position within the casing 59. The movement of the diaphragm 60 forces the rod 61 to move which in turn establishes an electric circuit, as before explained, thereby actuating the motor 15 to extend the auxiliary wings outwardly.

Figure 8:
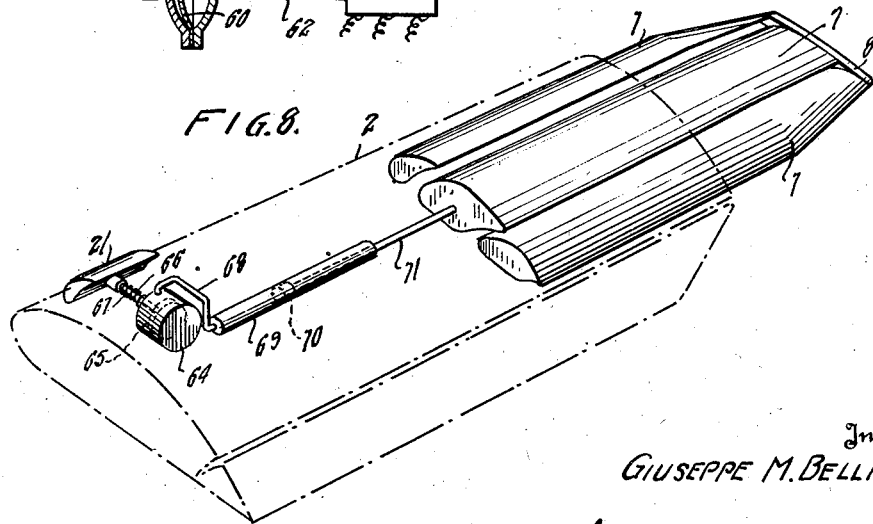
Figure 8 is a perspective view showing a modified means for actuating the auxiliary wings.

A modification of the auxiliary wings actuating means is shown in Figure 8. The plate 21 is adapted to actuate hydraulic means for retracting and extending the auxiliary wings. A cylinder 64 having a piston 65 therein is suitably associated with the wing 12. The piston 65 is connected to the plate 21 by means of a piston rod 66. A spring 67 is positioned between the cylinder 65 and plate 21, the purpose of which will hereinafter appear. Connected to the forward end of the cylinder 65 by means of a tube 68 is a cylinder 69. The cylinder 69 is of much smaller cross-section and greater length than the cylinder 64. A piston 70 is adapted to slide within the cylinder 69 and is connected to the auxiliary wings by means of a piston rod 71. The operation of the hydraulic means will be apparent. When the airplane has reached a cruising or greater speed, the plate 21 is depressed against the action of the spring 67. The piston 65 is likewise depressed within the cylinder 64 thereby allowing fluid to flow from the cylinder 69 to the cylinder 64. The piston 70 within the cylinder 69 is accordingly drawn inwardly carrying with it the auxiliary wings. Similarly, when the speed of the airplane decreases, more fluid is forced into cylinder 69 thereby pushing the piston 70 and auxiliary wings outwardly.

While I have shown and described a particular type of hydraulic means for actuating the auxiliary wings, other hydraulic means, such as a bellows arrangement may be employed.

It will be apparent from the foregoing that I have provided an airplane having auxiliary wings which may be actuated automatically or manually. There is also provided by this invention, optional control of each set of auxiliary wings to act in conjunction with the ailerons of the plane.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In an airplane having a fuselage and a main wing on each side thereof, a plate positioned within a slot in the leading edge of each wing, a lever, a rod connected to said lever, a plurality of auxiliary wings connected to said rod and means associated with said rod to complete an electric circuit upon actuation of the plate by air pressure.

2. In an airplane having a fuselage and a main wing on each side thereof, a plurality of auxiliary wings adapted to move outwardly and inwardly of each one of the main wings, an aerodynamic responsive member positioned adjacent the leading edge of the main wing, an electric motor for moving said auxiliary wing inwardly of the main wing, a switch in the circuit of the motor, the switch being connected with the said member to be actuated thereby, and means associated with the auxiliary wings and operative upon a predetermined position of the latter to stop the motor.

3. In an airplane having a fuselage and a main wing on each side thereof, a plurality of auxiliary wings adapted to move outwardly and inwardly of the main wings, an electric motor for moving such auxiliary wings, a switch in the circuit of the motor; an aerodynamic responsive member positioned adjacent the leading edge of the main wing and operatively associated with the switch to actuate the switch and thereby operate the motor, and means connected with the auxiliary wings and operatively associated with the switch.

4. In an airplane having a fuselage and a main wing on each side thereof, a plurality of auxiliary wings adapted to move outwardly and inwardly of each one of the main wings, an aerodynamic responsive member positioned adjacent the leading edge of the main wing, a motor for moving said auxiliary wing inwardly of the main wing, control means connected with the motor, the control means being associated with the said aerodynamic responsive member to be actuated thereby, and means associated with the auxiliary wing and operative upon a predetermined position of the latter to stop the motor.

GIUSEPPE M. BELLANCA.